United States Patent [19]
Rhodes

[11] Patent Number: 6,034,042
[45] Date of Patent: Mar. 7, 2000

[54] STAR POLYMER VISCOSITY INDEX IMPROVER FOR OIL COMPOSITIONS

[75] Inventor: Robert Barnett Rhodes, Houston, Tex.

[73] Assignee: Shell Oil Company, Houston, Tex.

[21] Appl. No.: 09/251,508

[22] Filed: Feb. 17, 1999

Related U.S. Application Data

[60] Provisional application No. 60/075,230, Feb. 19, 1998.

[51] Int. Cl.[7] .................... C10M 143/00; C08F 293/00
[52] U.S. Cl. ................ 508/591; 585/11; 585/13; 525/314; 525/316
[58] Field of Search .................... 508/591; 585/11, 585/13

[56] References Cited

U.S. PATENT DOCUMENTS

| | | | |
|---|---|---|---|
| H1799 | 8/1999 | Rhodes et al. | 525/314 |
| 4,116,917 | 9/1978 | Eckert | 260/33.6 |
| 4,156,673 | 5/1979 | Eckert | 260/33.6 AQ |
| 4,242,471 | 12/1980 | Lal | 525/333 |
| 4,900,875 | 2/1990 | Rhodes et al. | 585/11 |
| 5,070,131 | 12/1991 | Rhodes et al. | 524/484 |
| 5,266,647 | 11/1993 | Bender et al. | 525/314 |
| 5,360,564 | 11/1994 | Sutherland et al. | 252/51.5 A |
| 5,458,791 | 10/1995 | Rhodes et al. | 252/43 |
| 5,458,796 | 10/1995 | Storey et al. | 252/58 |
| 5,460,739 | 10/1995 | Rhodes et al. | 252/43 |
| 5,717,035 | 2/1998 | Coolbaugh et al. | 525/314 |

FOREIGN PATENT DOCUMENTS

| | | | |
|---|---|---|---|
| 1575449 | 2/1977 | United Kingdom | C10M 1/18 |

*Primary Examiner*—Ellen M. McAvoy
*Attorney, Agent, or Firm*—Donald F. Haas

[57] ABSTRACT

The present invention includes star polymers which can be used as viscosity index improvers in oil compositions formulated for high performance engines. The star polymers have tetrablock copolymer arms of hydrogenated polyisoprene-polybutadiene-polyisoprene with a block of polystyrene and which provide excellent low temperature performance in lubricating oils, exhibit good thickening efficiency, and are finishable as polymer crumb.

18 Claims, No Drawings

STAR POLYMER VISCOSITY INDEX IMPROVER FOR OIL COMPOSITIONS

This application claims the benefit of U.S. Provisional Application Ser. No. 60/075,230 Feb. 19, 1998, the entire disclosure of which is hereby incorporated by reference.

FIELD OF THE INVENTION

This invention relates to star polymers of hydrogenated isoprene and butadiene, and to oil compositions containing the star polymers. More particularly, this invention relates to such oil compositions with excellent low temperature properties and thickening efficiency and star polymers with excellent finishing characteristics.

BACKGROUND OF THE INVENTION

The viscosity of lubricating oils varies with temperature. In general, oils are identified by a viscosity index which is a function of the oil viscosity at a given lower temperature and a given higher temperature. The given lower temperature and the given higher temperature have varied over the years but are fixed at any given time in an ASTM test procedure (ASTM D2270). Currently, the lower temperature specified in the test is 40° C. and the higher temperature is 100° C. For two engine lubricants with the same kinematic viscosity at 100° C., the one having the lower kinematic viscosity at 40° C. will have the higher viscosity index. The oil with the higher viscosity index undergoes less kinematic viscosity change between the temperatures of 40° C. and 100° C. In general, viscosity index improvers that are added to engine oils increase the viscosity index as well as the kinematic viscosities.

The SAE Standard J300 viscosity classification system does not specify the use of viscosity index to classify multigrade oils. At one time, however, the Standard did require that certain grades meet low-temperature viscosities that were extrapolated from kinematic viscosity measurements taken at higher temperatures, for it was recognized that oils that were exceedingly viscous at low-temperatures caused engine starting difficulties in cold weather. For this reason, multigrade oils which possessed high viscosity index values were favored. These oils gave the lowest low-temperature extrapolated viscosities. Since then, ASTM has developed the cold cranking simulator (CCS), ASTM D5293, (formerly ASTM D2602) a moderately high-shear-rate viscometer which correlates with engine cranking speed and starting at low temperatures. Today cranking viscosity limits, determined by the CCS, are defined in the SAE J300 Standard and viscosity index is not used. For this reason, polymers that improve the viscosity characteristics of lubricating oils are sometimes referred to as viscosity modifiers instead of viscosity index improvers.

Today, it is also recognized that cranking viscosity is not sufficient to fully estimate a lubricant's low-temperature performance in engines. SAE J300 also requires that pumping viscosity be determined in a low-shear-rate viscometer called the mini-rotary viscometer IV). This instrument can be used to measure viscosity and gel formation, the latter by the measurement of yield stress. In this test, an oil is slowly cooled over a two-day period to a specified temperature before viscosity and yield stress are determined. A yield stress observation constitutes an automatic failure in this test, while pumping viscosity must be below a specified limit to ensure that the oil will not cause an engine to experience a pumping failure during cold weather conditions. The test is sometimes referred to as the TP1-MRV test, ASTM D4684.

Numerous materials are used in the formulation of fully-formulated multigraded engine oils. Besides the basestocks, which may include paraffinic, napthenic, and even synthetically-derived fluids, the polymeric VI improver, and the pour point depressants, there are numerous lubricant additives added which act as antiwear agents, antirust agents, detergents, dispersants, and pour point depressant. These lubricant additives are usually combined in diluent oil and are generally referred to as a dispersant-inhibitor package, or as a "DI" package.

Common practice in the formulation of a multigrade oil is to blend to a target kinematic viscosity and cranking viscosity, which is determined by the specified SAE grade requirements in SAE J300. The DI package and pour point depressant are combined with a VI improver oil concentrate and with one basestock, or two or more basestocks having different viscosity characteristics. For example, for an SAE 10W-30 multigrade, the concentration of the DI package and the pour point depressant might be held constant, but the amounts of HVI 100 neutral and HVI 250 neutral or HVI 300 neutral basestock might be adjusted along with the VI improver until the target viscosities are arrived at.

The pour point depressant's selection normally depends on the type of wax precursors in the lubricant basestocks. However, if the viscosity index improver itself is prone to interact with wax precursors, it may be necessary to add an additional pour point depressant of a different type, or an additional quantity of the pour point depressant used for the basestocks to compensate for that interaction. Otherwise, low-temperature rheology will deteriorate, and TP1-MRV failures will result. The use of additional pour point depressant generally increases the cost of formulating an engine lubricant.

Once a formulation has been arrived at that has the targeted kinematic viscosities and cranking viscosities, the TP1-MRV viscosity is determined. A relatively low pumping viscosity and the absence of yield stress is desirable. The use of a VI improver which contributes little to low-temperature pumping viscosity or yield stress is very desirable in the formulation of multigrade oils. It minimizes the risk of formulating an oil that may cause an engine pumping failure and it provides the oil manufacturer with additional flexibility in the use of other components which contribute to pumping viscosity.

Viscosity index improvers that are hydrogenated star polymers containing hydrogenated polymeric arms of copolymers of conjugated dienes, including polybutadiene made by the high 1,4-addition of butadiene, were previously described in U.S. Pat. No. 4,116,917. U.S. Pat. No. 5,460,739 describes star polymers with (EP-EB-EP') arms as VI improvers. Such polymers produce good thickening characteristics but are difficult to finish. U.S. Pat. No. 5,458,791 describes star polymers with (EP-S-EP') arms as VI improvers. Such polymers have excellent finishability characteristics and produce oils with good low temperature performance but the thickening characteristics are diminished. It would be advantageous to be able to produce a polymer with good thickening characteristics and excellent finishing characteristics. The present invention provides such a polymer.

SUMMARY OF THE INVENTION

The present invention includes star polymers useful as viscosity index improvers in oil compositions formulated for high performance engines. The star polymers have specific tetrablock copolymer arms of hydrogenated poly(styrene-isoprene-butadiene-isoprene) or alternative combinations which will be described. When properly arranged, the tetrablocks significantly improve low temperature performance of the polymers as viscosity index improvers 1) when the star polymers comprise from 3% to 15% by weight of hydrogenated polybutadiene blocks which have at least 85 mol % 1,4-polymerization of the butadiene and 2) when the ratio of the number average molecular weight of the outer polyisoprene blocks to the inner polyisoprene blocks is from 0.75:1 to 7.5:1 prior to hydrogenation. The star polymers of this invention provide reduced viscosity at low temperatures in comparison to star polymers having block ratios lower than 0.75:1 or higher than 7.5:1.

These polymers can be used with a base oil to make a viscosity improved oil composition. Concentrates can also be made. These will contain at least 75% by weight of the base oil and 5 to 25% by weight of the star polymer.

DETAILED DESCRIPTION OF THE INVENTION

The star polymers of the present invention are readily produced by the processes described in Canadian Patent No. 716,645 and U.S. Pat. No. Re 27,145 which are herein incorporated by reference. However, the star polymers of the present invention have molecular weights and compositions which are not taught by the references and are selected to obtain surprisingly improved low temperature performance as a viscosity index improver.

Star polymers of the present invention combine hydrogenated polyisoprene blocks and hydrogenated polybutadiene blocks in molecules having a structure selected from the group consisting of (I) (S-EP-EB-EP')$_n$-X (II) (EP-S-EB-EP')$_n$-X (III) (EP-EB-S-EP')$_n$-X wherein EP is an outer hydrogenated block of polyisoprene having a number average molecular weight ($MW_1$) between 6,500 and 85,000 before hydrogenation, EB is a hydrogenated block of polybutadiene having at least 85% 1,4-polymerization of the butadiene and having a number average molecular weight ($MW_2$) between 1,500 and 15,000 before hydrogenation, EP' is an inner hydrogenated block of polyisoprene having a number average molecular weight ($MW_3$) of between 1,500 and 55,000, S is a block of polystyrene having a number average molecular weight ($MW_s$) between 1,000 and 4,000 when the S block is external (I) and between 2,000 and 15,000 when the S block is internal (II and III), wherein the star polymer comprises less than 15% by weight of the polybutadiene, the ratio of $MW_1/MW_3$ is from 0.75:1 to 7.5:1 before hydrogenation, X is a nucleus of a polyalkenyl coupling agent, and n is the average number of block copolymer arms per star molecule formed by the reaction of 2 or more moles of the polyalkenyl coupling agent per mole of arms.

The living polymer molecules are coupled with a polyalkenyl coupling agent such as divinylbenzene wherein the ratio of moles of divinylbenzene to living polymer molecules is at least 2:1, and preferably at least 3:1. The star polymer is then selectively hydrogenated to saturate at least 95% by weight of the isoprene and butadiene units.

Although the reason for the improvement at low temperatures is not fully understood, it is believed that modification of the star arms by addition of a polystyrene block as described causes a smaller effective chain length at lower temperatures as a result of intramolecular association of the styrene blocks. Each of the arms of any given star polymer is identical in molecular weight (and length) and block position. Intramolecular association of polystyrene is believed to facilitate an additional mechanism which is the microcrystallization of the EB blocks. Once association of the polystyrene occurs, the EB blocks are expected to be better positioned for crystallization. While I do not wish to be bound by this theory, it does appear to fit the observations since the intramolecular forces appear to cause the arms to shrink or coil up—the polystyrene associates with itself and the EB crystallizes. This lowers the viscosity contribution of the polymer in oil.

When the temperature increases, the microcrystalline EB segments melt and the styrene blocks disassociate. This provides longer effective chain lengths and a greater contribution to kinematic viscosity, which is not desired at the lower temperatures. Both the size and placement of the styrene blocks are critical for improved performance. The polymers described by this invention contribute less to viscosity as measured in the TP1-MRV test than polymers that do not have the additional polystyrene block. Some of the polymers described by this invention also provide multigrade oils with higher viscosity indexes than hydrogenated, all-polyisoprene star polymers or other hydrogenated poly (styrene/isoprene) block copolymer star polymers.

The present invention has an advantage of a previous discovery that cyclone finishable star polymers which provide high high-temperature, high-shear rate (HTHSR) viscosities in engine oils are prepared by addition of small polystyrene blocks to the star polymers. The previous discovery showed that polystyrene blocks enhanced cyclone-finishing without gelling the oil when the polystyrene block has a 3,000 to 4,000 number average molecular weight and were at the external position, farthest away from the core. In this invention, it has been discovered that the same advantage is achieved when the polystyrene blocks are internal in a tetrablock copolymer and, in the internal case, the polystyrene block molecular weight does not need to be limited to 4,000 maximum.

Star polymers that contain hydrogenated polyisoprene arms do not suffer this interaction with wax precursors because of the abundance of pendant alkyl side-chain groups that are present when 1,4-addition, 3,4-addition, or 1,2-addition occurs with isoprene. The star polymers of this invention are designed to be minimally interactive to wax, like the hydrogenated all-polyisoprene-arm star polymers, but have better performance than the all-polyisoprene-arm stars because they undergo coil volume collapse at low temperature due to crystallization.

To counteract the high polyethylene-like density near the center of the star, the hydrogenated butadiene blocks are placed further from the nucleus by insertion of an internal EP' block. It is not known with certainty why such positioning should be favored. However, it is believed that when hydrogenated star polymers are used as viscosity index improvers which have hydrogenated arms containing polybutadiene and polyisoprene blocks, the hydrogenated polyethylene-like segment of one arm is further away from adjacent neighbors in solution and the interaction of a wax precursor with multiple hydrogenated polybutadiene blocks of the same polymer molecule is less favored.

On the other hand, polyethylene-like hydrogenated polybutadiene blocks cannot be placed too close to the outer edge or periphery of the star molecule. While wax-polyethylene interaction is to be minimized, the placement of the hydrogenated polybutadiene blocks too close to the outside of the star molecule will result in the inter-molecular crystallization of these arms in solution. An increase in viscosity and possibly gelling occurs, which is brought about by the three dimensional crystallization of many star molecules to form a lattice structure. S-EP outer blocks (see I), EP-S outer blocks (II), or the EP outer blocks (as in III) are needed so that intramolecular association predominates. To achieve the dual goals of minimizing intermolecular crystallization and interaction with wax, the ratio of EP/EP' molecular weights ($MW_1/MW_3$) should be from 0.75:1 to 7.5:1.

The crystallization temperature of these hydrogenated star polymers in oil may be lowered by reducing the block molecular weight of hydrogenated polybutadiene together with placement of the hydrogenated polybutadiene between hydrogenated polyisoprene segments and by substitution of S blocks for EB blocks. This reduction in EB results in improved low-temperature TP1-MRV test results. It also results in the additional benefit of butadiene-containing star polymers that are less sensitive to pour point depressant type or concentration and which do not provide oils which have time-dependent viscosity indexes. The invention thus describes semicrystalline star polymer viscosity index improvers that provide superior low-temperature performance and which do so without the use of relatively high concentrations of pour point depressant or the need for supplemental pour point depressants.

The star polymers of this invention which are useful as VI improvers are preferably prepared by anionically polymerizing isoprene in the presence of see-butyllithium, adding butadiene to the living polyisopropyl lithium after the polymerization of the outer block is complete, adding isoprene to the polymerized living block copolymer, adding styrene at the desired point depending upon the desired location of the polystyrene block, and then coupling the living block copolymer molecules with a polyalkenyl coupling agent to form a star polymer, followed by hydrogenation. It is important to maintain high 1,4-addition throughout the polymerization of the butadiene block of the block copolymer so that polyethylene-like blocks of sufficient molecular weight are also obtained. However, it is not important that the inner polyisoprene block be made by high 1,4-addition of isoprene. Thus, it should be feasible to add a randomizer such as diethyl ether to the living block copolymer after the attainment of a sufficient molecular weight of high 1,4-addition butadiene had been obtained.

The randomizer could be added at the conclusion of the butadiene polymerization, and before introduction of more isoprene to give the second polyisoprene block. Alternatively, the randomizer could be added before completion of the butadiene block polymerization, and concurrent with the introduction of isoprene.

The star polymers of the present invention may be characterized prior to hydrogenation as having a dense center or nucleus of crosslinked poly(polyalkenyl coupling agent) and a number of block copolymer arms extending outwardly therefrom. The number of arms, as determined by low angle laser light scattering studies may vary considerably but typically range from about 13 to about 22.

In general, the star polymers may be hydrogenated using any of the techniques known in the prior art to be suitable for hydrogenation of olefinic unsaturation. However, the hydrogenation conditions must be sufficient to hydrogenate at least 95% of the original olefinic unsaturation, and conditions must be employed so that the partially-hydrogenated or fully-hydrogenated polybutadiene blocks do not crystallize and separate from solvent before hydrogenation, or catalyst wash-out is complete. Depending on the percentage of butadiene used in preparation of the star polymer, during and subsequent to hydrogenation in cyclohexane, there is sometimes a marked increase in the viscosity of the solution. To avoid crystallization of the polybutadiene blocks, the solvent temperature should be maintained above the temperature where crystallization would occur.

In general, hydrogenation involves the use of a suitable catalyst as described in U.S. Pat. No. Re 27,145 which is herein incorporated by reference. A mixture of nickel ethylhexanoate and triethylaluminum having from 1.8 to 3 moles of aluminum per mole of nickel is preferred.

The hydrogenated star polymers of this invention may be added to a variety of lubricating oils to improve viscosity index characteristics. For example, the selectively hydrogenated star polymers may be added to fuel oils such as middle distillate fuels, synthetic and natural lubricating oils, crude oils and industrial oils. In addition to engine oils, they may be used in the formulation of automatic transmission fluids, gear lubricants, and hydraulic fluids. In general, any amount of the selectively hydrogenated star polymers may be blended into the oils, with amounts from about 0.05 to about 10 wt % being most common. For engine oils, amounts within the range from about 0.2 to about 2 wt % are preferred.

Lubricating oil compositions prepared with the hydrogenated star polymers of this invention may also contain other additives such as anti-corrosive additives, antioxidants, detergents, pour point depressants, one or more additional VI improvers and the like. Typical additives which are useful in the lubricating oil composition of this invention and their description will be found in U.S. Pat. Nos. 3,772,196 and 3,835,083, the disclosure of which patents are herein incorporated by reference.

PREFERRED EMBODIMENT OF THE INVENTION

Preferred star polymers of the present invention combine hydrogenated polyisoprene blocks and hydrogenated polybutadiene blocks in molecules having the structure (S-EP-EB-EP')$_n$-X wherein EP is an outer hydrogenated block of polyisoprene having a number average molecular weight ($MW_1$) between 15,000 and 65,000 before hydrogenation, EB is a hydrogenated block of polybutadiene having at least 89% 1,4-polymerization of the butadiene and having a number average molecular weight ($MW_2$) between 2,000 and 6,000 before hydrogenation, EP' is an inner hydrogenated block of polyisoprene having a number average molecular weight ($MW_3$) of between 5,000 and 40,000, S is blocks of polystyrene having a number average molecular weight ($MW_s$) between 2,000 and 4,000 when the S blocks are external and between 4,000 and 12,000 when the S blocks are internal, wherein the star polymer comprises less than 10% by weight of the polybutadiene, the ratio of $MW_1/MW_3$ is from 0.9:1 to 5:1 before hydrogenation, X is a nucleus of a polyalkenyl coupling agent, and n is the average number of(S-EP-EB-EP') arms per star molecule.

The coupled polymers are selectively hydrogenated with a solution of nickel ethylhexanoate and triethylaluminum having a Al/Ni ratio of about 1.8:1 to 2.5:1 to saturate at least 98% of the isoprene and butadiene units.

Having thus broadly described the present invention and the preferred embodiment, the invention is further described by the following examples which should not be construed as the limits of the invention.

EXAMPLES

Polymers 1 through 3 were made according to the present invention. Polymers 1 and 2 have internal polystyrene blocks and Polymer 3 has an external polystyrene block on each star arm. These polymers were compared to two polymers made according to U.S. Pat. No. 5,460,739, Polymers 4 and 5, two commercial polymers, Polymers 6 and 7, and a polymer made according to U.S. Pat. No. 5,458,791, Polymer 8. The polymer compositions and melt viscosities of these polymers are shown in Table 1.

testing for lubricant viscosity loss according to test procedure CEC L-14-A-93 show that Polymers 1 through 3 are representative of VI improvers having high to intermediate mechanical shear stability. These results are shown in Table 2. The high shear rate viscosity, as measured in the Tapered Bearing Simulator (TBS) at 150° C. was typical of conventional star polymers having this level of permanent stability.

TABLE 1

Polymer Composition and Melt Viscosity

| Polymer | Step 1 block | Step 2 block | Step 3 block | Step 4 block | Step 1 MW (true) | Step 2 MW (true) | Step 3 MW (true) | Step 4 MW (true) | Polystyrene Content, % calc. basis arm MW | Melt Vis 120° C., MPa-s | $I_1/I_2$ |
|---|---|---|---|---|---|---|---|---|---|---|---|
| 1 | $I_1$ | S | B | $I_2$ | 32,500 | 10,200 | 3,300 | 19,500 | 15.6 | 2.8 | 1.67 |
| 2 | $I_1$ | S | B | $I_2$ | 36,000 | 5,800 | 7,300 | 14,000 | 9.2 | 2.2 | 2.57 |
| 3 | S | $I_1$ | B | $I_2$ | 3,100 | 26,100 | 6,000 | 14,200 | 6.3 | 1.6 | 1.84 |
| 4 | $I_1$ | B | $I_2$ | — | 31,500 | 4,400 | 21,400 | — | 0 | 1.3 | 1.47 |
| 5 | $I_1$ | B | $I_2$ | — | 37,600 | 3,600 | 13,600 | — | 0 | 1.1 | 2.76 |
| 6[a] | I | S | na | na | 65,000 | 35,000 | na | na | 35 | 1.7 | — |
| 7 | S | I | — | — | 3,500 | 51,000 | — | — | 6.4 | 1.7 | — |
| 8 | $I_1$ | S | $I_2$ | — | 34,200 | 9,100 | 14,300 | — | 16.5 | 1.8 | 2.39 | na = not applicable or available.
a = a linear polymer.

TABLE 2

Performance in SAE 10W-40 Multigrade Oils

| Polymer | Polymer % wt | Kin Vis, 100° C., cSt | VI | TBS,[b] 150° C., cP | DIN Vis Loss, % | DIN P, MPa | CCS[c] -20° C. cP | TP1[d] -30° C., cP |
|---|---|---|---|---|---|---|---|---|
| 1 | 1.02 | 13.92 | 163–200[a] | 3.67 | 10.4 | 14.2 | 2,740 | 22,900 |
| 2 | 0.96 | 14.02 | 161 | 3.67 | 10.9 | 14.2 | 2,980 | 32,800 |
| 3 | 1.08 | 13.92 | 161 | 3.69 | 4.0 | 14.2 | 2,890 | 24,400 |
| 4 | 0.93 | 13.97 | 163 | 3.51 | 11.0 | 14.7 | 2,800 | 24,100 |
| 5 | 0.94 | 13.87 | 161 | 3.59 | 8.8 | 13.4 | 2,850 | 23,300 |
| 6 | 1.21 | 13.47 | 164 | 3.37 | 2.0 | 13.4 | 2,750 | 37,200 |
| 7 | 0.95 | 14.00 | 162 | 3.58 | 11.8 | 17.0 | 2,970 | 36,600 |
| 8 | 1.06 | 13.93 | 169 | 3.58 | 8.2 | 14.5 | 2,980 | 30,200 | na = not applicable or available.
[a]VI increased with time
[b]HTHSR viscosity limit is 2.9 cP min (SAE Standard J300)
[c]Cranking viscosity limit is 3500 cP max (SAE Standard J300)
[d]Pumping viscosity limit is 60,000 cP max (SAE Standard J300)

Polymers 1 and 2 clearly have superior melt viscosities to the commercial polymers and the polymers of the '739 and '791 patents. Polymer 3 has a superior melt viscosity to those of the '739 patent. The melt viscosity of polymer 3 is slightly lower than the commercial star polymer 7, although the polymers have approximately the same polystyrene contents. However, the total arm molecular weight, which is the sum of the step 1 through step 4 molecular weights, is lower for polymer 3 than the total arm molecular weight of polymer 7, which is the sum of the step 1 and step 2 molecular weight. If polymer 3 were modified by increasing the step 2, step 3, or step 4 molecular weight so that the total arm molecular weight approximated that of polymer 7, it is expected that the melt viscosity would match or exceed that of polymer 7. Generally, polymers with higher melt viscosities are easier to cyclone finish.

Polymer concentrates were prepared using Exxon HVI 100N LP basestock. The concentrates were used to prepare fully formulated SAE 10W-40 multigrade oils. In addition to VI improver concentrate, these oils contained a pour point depressant, dispersant inhibitor package, and Shell HVI100N and HVI250N base oil. Diesel injector rig (DIN)

This is significant because the results easily exceed the minimum requirement of SAE Standard J300. Polymers 1 and 3 matched the outstanding TP1-MRV performance of Polymers 4 and 5.

The SAE 10W-40 multigrade oil which contained Polymer 1 also exhibited a viscosity index time dependence. Over a three week period of room temperature storage, the viscosity index increased from 163 to 200. The kinematic viscosity at 100° C. did not change but the 40° C. viscosity dropped from 88 to 72 centistokes. Polymers 2 and 3 did not show a time dependence.

The Exxon HVI100N polymer concentrates were also used to prepare fully-formulated SAE 5W-30 multigrade oils. These results are given in Table 3. In addition to the VI improvers, these oils contained pour point depressant, a dispersant inhibitor package, and additional Exxon HVI100N LP base oil. Given the reproducibility of the TP1-MRV test at −35° C., there was no significant difference in performance between Polymers 1, 2, and 3, versus 4 and 5, but all were significantly better than polymer 8, as well as the commercial Polymers 6 and 7.

TABLE 3

Performance in SAE 5W-30 Multigrade Oils

| Polymer | Polymer % wt | Kin Vis, 100° C., cSt | VI | TBS, 150° C., cP | CCS, −25° C., cP | TP1 −35° C., cP |
|---|---|---|---|---|---|---|
| 1 | 0.72 | 10.40 | 161[a] | 3.05 | 3,290 | 29,000 |
| 2 | 0.67 | 10.40 | 159 | 3.07 | 3,490 | 31,200 |
| 3 | 0.76 | 10.38 | 159 | 3.07 | 3,510 | 31,000 |
| 4 | 0.66 | 10.66 | 162 | 3.05 | 3,230 | 27,600 |
| 5 | 0.68 | 10.65 | 161 | 3.02 | 3,220 | 28,700 |
| 6 | 0.89 | 10.35 | 162 | 2.88 | 3,280 | 46,800 |
| 7 | 0.68 | 10.62 | 166 | 3.01 | 3,330 | 47,000 |
| 8 | 0.75 | 10.54 | 165 | 3.02 | 3,290 | 41,400 |

[a] the time-dependent behavior was not verified in this case by monitoring kinematic viscosity with time.

VI is the viscosity index and it is determined by ASTM D2270. High-temperature high-shear rate viscosity (HTHSR) at 150° C. is determined in the tapered bearing simulator (TBS) by ASTM 4683. DIN VIS loss is the viscosity loss at 100° C. and is determined by CEC L-14-A-93. CCS is the cold cranking simulator viscosity and is determined by ASTM D5293. TP1 represents the TP1-MRV viscosity as determined in the mini-rotary viscometer test method, ASTM D4684.

What is claimed is:

1. A solid polymeric viscosity index (VI) improver, comprising a star polymer structure selected from the group consisting of (I) $(S\text{-}EP\text{-}EB\text{-}EP')_n\text{-}X$ (II) $(EP\text{-}S\text{-}EB\text{-}EP')_n\text{-}X$ (III) $(EP\text{-}EB\text{-}S\text{-}EP')_n\text{-}X$ wherein
EP is an outer hydrogenated block of polyisoprene having a number average molecular weight ($MW_1$) between 6,500 and 85,000 before hydrogenation;
EB is a hydrogenated block of polybutadiene having a number average molecular weight ($MW_2$) between 1,500 and 15,000 before hydrogenation and having at least 85% 1,4-polymerization;
EP' is an inner hydrogenated block of polyisoprene having a number average molecular weight ($MW_3$) between 1,500 and 55,000 before hydrogenation;
S is a block of polystyrene having a number average molecular weight ($MW_s$) of 1,000 to 4,000 when the S block is external (I) and 2,000 to 15,000 when the S block is internal (II or III);
wherein the star polymer structure comprises from 3% to 15% by weight of the butadiene, the ratio of $MW_1/MW_3$ is from 0.75:1 to 7.5:1, X is a nucleus of a polyalkenyl coupling agent, and n is the number of block copolymer arms in the star polymer when coupled with 2 or more moles of the polyalkenyl coupling agent per mole of living block copolymer molecules.

2. The VI improver of claim 1, wherein the polyalkenyl coupling agent is divinylbenzene.

3. The VI improver of claim 2, wherein the molecular weight of the outer polyisoprene blocks is between 15,000 and 65,000 before hydrogenation, the molecular weight of the polybutadiene block is between 2,000 and 6,000 before hydrogenation, the molecular weight of the inner polyisoprene blocks is between 5,000 and 40,000 before hydrogenation, the molecular weight of the polystyrene block is between 2,000 and 4,000 when the S block is external (I) and between 4,000 and 12,000 when the S block is internal, the star polymer comprises less than 10% by weight of the butadiene, and the ratio of $MW_1/MW_3$ is from 0.9:1 to 5:1.

4. The VI improver of claim 3, wherein the 1,4-polymerization of the polybutadiene block is at least 89%.

5. The VI improver of claim 4, wherein n is the number of arms when coupled with at least 3 moles of divinylbenzene per mole of living block copolymer molecules.

6. The VI improver of claim 1, wherein the polyisoprene blocks and the polybutadiene blocks are at least 98% hydrogenated.

7. An oil composition comprising:
a base oil; and
a viscosity improving amount of a star polymer having the structure (I) $(S\text{-}EP\text{-}EB\text{-}EP')_n\text{-}X$ (II) $(EP\text{-}S\text{-}EB\text{-}EP')_n\text{-}X$ (III) $(EP\text{-}EB\text{-}S\text{-}EP')_n\text{-}X$ wherein:
EP is an outer hydrogenated block of polyisoprene having a number average molecular weight ($MW_1$) between 6,500 and 85,000 before hydrogenation;
EB is a hydrogenated block of polybutadiene having a number average molecular weight ($MW_2$) between 1,500 and 15,000 before hydrogenation and having at least 85% 1,4-polymerization;
EP' is an inner hydrogenated block of polyisoprene having a number average molecular weight ($MW_3$) of between 1,500 and 55,000 before hydrogenation;
S is a block of polystyrene having a number average molecular weight ($MW_s$) of 1,000 to 4,000 when the S block is external (I) and 2,000 to 15,000 when the S block is internal (II or III);
wherein the star polymer comprises from 3% to 15% by weight of the butadiene, the ratio of $MW_1/MW_3$ is from 0.75:1 to 7.5:1, X is a nucleus of a polyalkenyl coupling agent, and n is the number of block copolymer arms in the star polymer when coupled with 2 or more moles of the polyalkenyl coupling agent per mole of living block copolymer molecules.

8. The oil composition of claim 7, wherein the polyalkenyl coupling agent is divinylbenzene.

9. The oil composition of claim 8, wherein the molecular weight of the outer polyisoprene blocks is between 15,000 and 65,000 before hydrogenation, the molecular weight of the polybutadiene block is between 2,000 and 6,000 before hydrogenation, the molecular weight of the inner polyisoprene blocks is between 5,000 and 40,000 before hydrogenation, the molecular weight of the polystyrene block is between 2,000 and 4,000 when the S block is external (I) and between 4,000 and 12,000 when the S block is internal, the star polymer comprises less than 10% by weight of the butadiene, and the ratio of $MW_1/MW_3$ is from 0.9:1 to 5:1.

10. The oil composition of claim 9, wherein the 1,4-polymerization of the polybutadiene blocks is at least 89%.

11. The oil composition of claim 10, wherein n is the number of arms when coupled with at least 3 moles of divinylbenzene per mole of living block copolymer molecules.

12. The oil composition of claim 7, wherein the polyisoprene blocks and the polybutadiene blocks are at least 98% hydrogenated.

13. A polymeric concentrate for oil compositions comprising:
   at least 75% by weight of a base oil; and
   from 5% to 25% by weight of a star polymer having the structure (I) $(S-EP-EB-EP)_n-X$ (II) $(EP-S-EB-EP')_n-X$ (III) $(EP-EB-S-EP')_n-X$ wherein:
   EP is an outer hydrogenated block of polyisoprene having a number average molecular weight ($MW_1$) between 6,500 and 85,000 before hydrogenation;
   EB is a hydrogenated block of polybutadiene having a number average molecular weight ($MW_2$) between 1,500 and 15,000 before hydrogenation and having at least 85% 1,4-polymerization;
   EP' is an inner hydrogenated block of polyisoprene having a number average molecular weight ($MW_3$) of between 1,500 and 55,000 before hydrogenation;
   S is a block of polystyrene having a number average molecular weight ($MW_s$) of 1,000 to 4000 when the S block is external (I) and 2,000 to 15,000 when the S block is internal (II or III);
   wherein the star polymer comprises from 3% to 15% by weight of the butadiene, the ratio of $MW_1/MW_3$ is from 0.75:1 to 7.5:1, X is a nucleus of a polyalkenyl coupling agent, and n is the number of block copolymer arms in the star polymer when coupled with 2 or more moles of the polyalkenyl coupling agent per mole of living block copolymer molecules.

14. The polymeric concentrate of claim 13, wherein the polyalkenyl coupling agent is divinylbenzene.

15. The polymeric concentrate of claim 14, wherein the molecular weight of the outer polyisoprene blocks is between 15,000 and 65,000 before hydrogenation, the molecular weight of the polybutadiene block is between 2,000 and 6,000 before hydrogenation, the molecular weight of the inner polyisoprene blocks is between 5,000 and 40,000 before hydrogenation, the molecular weight of the polystyrene block is between 2,000 and 4,000 when the S block is external (I) and between 4,000 and 12,000 when the S block is internal, the star polymer comprises less than 10% by weight of the butadiene, and the ratio of $MW_1/MW_3$ is from 0.9:1 to 5:1.

16. The polymeric concentrate of claim 15, wherein the 1,4-polymerization of the polybutadiene blocks is at least 89%.

17. The polymeric concentrate of claim 16, wherein n is the number of arms when coupled with at least 3 moles of divinylbenzene per mole of living block copolymer molecules.

18. The polymeric concentrate of claim 13, wherein the polyisoprene blocks and the polybutadiene blocks are at least 98% hydrogenated.

* * * * *